(12) United States Patent
Ihara

(10) Patent No.: US 9,062,171 B2
(45) Date of Patent: Jun. 23, 2015

(54) METHOD FOR PRODUCING RUBBER COMPOSITION

(71) Applicant: TOYO TIRE & RUBBER CO., LTD., Osaka-shi, Osaka (JP)

(72) Inventor: Ikuo Ihara, Osaka (JP)

(73) Assignee: TOYO TIRE & RUBBER CO., LTD., Osaka-shi (JP)

( * ) Notice: Subject to any disclaimer, the term of this patent is extended or adjusted under 35 U.S.C. 154(b) by 0 days.

(21) Appl. No.: 14/211,060

(22) Filed: Mar. 14, 2014

(65) Prior Publication Data

US 2015/0031795 A1   Jan. 29, 2015

(30) Foreign Application Priority Data

Jul. 29, 2013  (JP) .................. 2013-156597

(51) Int. Cl.
*B01F 3/18* (2006.01)
*C08J 3/22* (2006.01)
*C08K 3/04* (2006.01)
*C08K 5/25* (2006.01)

(52) U.S. Cl.
CPC ... *C08J 3/22* (2013.01); *C08K 3/04* (2013.01); *C08K 5/25* (2013.01)

(58) Field of Classification Search
CPC ....................................................... C08J 3/203
USPC .................................. 523/322, 351; 524/192
See application file for complete search history.

(56) References Cited

U.S. PATENT DOCUMENTS 5,534,569 A   7/1996  Etoh
6,380,288 B1  4/2002  Hojo et al.

FOREIGN PATENT DOCUMENTS

| JP | 07-057828 B2 | 6/1995 |
| JP | 08-027315 A | 1/1996 |
| JP | 10-330549 A | 12/1998 |
| JP | 2001-172435 A | 6/2001 |

*Primary Examiner* — Edward Cain
(74) *Attorney, Agent, or Firm* — Westerman, Hattori, Daniels & Adrian, LLP

(57) ABSTRACT

After step (I) of kneading a diene rubber and a carbon black to be mixed with each other, and then discharging the resultant mixture containing the diene rubber and the carbon black from an internal mixer, step (II) of kneading the mixture again in the internal mixer to crush a re-aggregate of the carbon black in the mixture, and step (III) of charging the dihydrazide compound into the internal mixer, and kneading the mixture and the dihydrazide compound to be mixed with each other are carried out. The period of step (II) for the kneading is 15 seconds or longer, and the rotating speed of the stirring rotor of the internal mixer is 35 rpm or more. The period of step (III) for the kneading is 40 seconds or longer, and the rotating speed of the stirring rotor of the internal mixer is from 15 to 25 rpm.

3 Claims, No Drawings

METHOD FOR PRODUCING RUBBER COMPOSITION

BACKGROUND OF THE INVENTION

1. Field of the Invention

The present invention relates to a method for producing a rubber composition. The rubber composition is useful as a raw material of a vulcanized rubber excellent in low thermogenic performance.

2. Description of the Related Art

In recent years, developments of fuel-efficient tires have been actively made in the tire industry from the viewpoint of energy saving. It is said that for the fuel-efficient tire developments, it is indispensable to improve, in particular, the low thermogenic performance of respective rubber regions of tire treads that are obtained by vulcanization.

As a technique for improving a vulcanized rubber in low thermogenic performance, Patent Document 1 listed below describes a technique of blending a hydrazide compound and a reinforcing filler into a rubber composition as a raw material.

Patent Document 2 listed below describes a technique that is a method of kneading a rubber composition containing a raw material polymer, a hydrazide compound and a carbon black, in which the raw material polymer and the hydrazide compound are earlier kneaded, and then the carbon black is added thereto to knead the resultant mixture.

Patent Document 3 listed below describes a technique of using, for a tire tread region of a pneumatic tire, a rubber composition in which 0.05 to 5 parts by mass of a specific hydrazide compound is blended into 100 parts by mass of a rubber component.

Patent Document 4 listed below describes a technique of mixing a natural rubber and a carbon black with each other in a first kneading step, and then charging/blending a dihydrazide compound into the mixture in a second kneading step.

PRIOR ART DOCUMENTS

Patent Documents

Patent Document 1: JP-B-7-57828
Patent Document 2: JP-A-8-27315
Patent Document 3: JP-A-10-330549
Patent Document 4: JP-A-2001-172435

SUMMARY OF THE INVENTION

However, the present inventors have made eager investigations to find out that the above-mentioned precedent techniques have problems described below. Specifically, according to the technique described in Patent Document 1, the rubber composition tends to be deteriorated in workability, and further for improving a vulcanized rubber therefrom in low thermogenic performance, it is desired to enhance the low thermogenic performance.

In the technique described in Patent Document 2, without performing simultaneous kneading of a raw material polymer, a hydrazide compound and a carbon black, the carbon black is afterward blended into the others, whereby in reaction of the polymer with the hydrazide compound, this compound is caused to react preferentially with the polymer without causing the polymer and the carbon black to compete with each other. However, the resultant rubber composition tends to be still deteriorated in workability. There also remains a room for a further improvement in the low thermogenic performance of a vulcanized rubber yielded from the composition.

The inventions of Patent Documents 3 and 4 are each an invention using a specific hydrazide compound lowered in reactivity by giving a specific functional group to hydrazide. Patent Document 4 is more specifically an invention in which the specific hydrazide compound is mixed with zinc oxide at the same kneading stage, and the temperature for the mixing is specified into the range of 130 to 170° C. to prepare a vulcanized rubber having a lower thermogenic performance. In order to yield the hydrazide compound having the specific functional group, it is necessary to conduct reactions over several stages. Thus, disadvantages are produced from the viewpoint of costs for producing the hydrazide compound having the specific structure, and energy consumption for the rubber production.

The present invention has been made in light of the above-mentioned actual situation, and an object thereof is to provide a method for producing a rubber composition that can improve the produced rubber composition in workability and further improve a vulcanized rubber yielded from the composition in low thermogenic performance. Another object of the invention is to provide a pneumatic tire having a low thermogenic performance, and equipped with a tire tread that can attain an excellent fuel efficiency.

In order to solve the above-mentioned problems, the present invention is the following method: a method for producing a rubber composition, using an internal mixer having a stirring rotor to mix a diene rubber, a carbon black and a dihydrazide compound with each other, including step (I) of kneading the diene rubber and the carbon black to be mixed with each other, and then discharging the resultant mixture containing the diene rubber and the carbon black from the internal mixer, step (II) of kneading the mixture again in the internal mixer to crush a re-aggregate of the carbon black in the mixture, and step (III) of charging, after step (II), the dihydrazide compound into the internal mixer, and kneading the mixture and the dihydrazide compound to be mixed with each other, wherein in step (II), the period for the kneading is 15 seconds or longer, and the rotating speed of the stirring rotor of the internal mixer is 35 rpm or more, and in step (III), the period for the kneading is 40 seconds or longer, and the rotating speed of the stirring rotor of the internal mixer is from 15 to 25 rpm.

The rubber composition producing method according to the present invention includes step (I) of kneading a diene rubber and a carbon black to be mixed with each other in an internal mixer having a stirring rotor, and then discharging the mixture containing the diene rubber and the carbon black from this internal mixer. Through step (I), the dispersibility of the carbon black in the rubber composition is made high so that in step (III), which will be later performed, a dihydrazide compound is to be capable of being caused to react evenly with the whole of particle surfaces of the carbon black. When the dihydrazide compound is to be blended into the rubber composition in the invention, the mixture containing the diene rubber and the carbon black is once discharged from the internal mixer in order to keep the rubber temperature as low as possible. As in this case the discharged rubber composition is cooled, the carbon black in the rubber composition tends to be again aggregated. Consequently, even when the dihydrazide compound is to be blended into the mixture in the state that the carbon black is poor in dispersibility in the mixture, the effect of improving carbon black dispersibility cannot be obtained which is caused by blending the dihydrazide compound into the rubber composition.

However, in the present invention, after step (I), the mixture is again kneaded in the internal mixer to crush the re-aggregate of the carbon black in the mixture (step (II)). After step (II), the dihydrazide compound described just above is charged into the internal mixer, and then the mixture and the dihydrazide compound are kneaded to be mixed with each other (step (III)). As a result, in the rubber composition, the re-aggregate of the carbon black is crushed so that the carbon black in the state of being heightened in dispersibility can be caused to react with the dihydrazide compound. Thus, even when the resultant rubber composition is to be made finally into a vulcanized rubber, the carbon black is to be capable of being heightened in dispersibility. As a result, in the vulcanized rubber, which is obtained from the rubber composition obtained by the rubber composition producing method according to the invention, the carbon black is improved in dispersibility, so that the vulcanized rubber is improved in low thermogenic performance. Furthermore, in the rubber composition, the improvement of the carbon black in dispersibility makes it possible to restrain the rubber composition from being raised in viscosity. As a result, in the invention, the rubber composition is improved in workability.

Furthermore, according to the rubber composition producing method according to the invention, in step (II), the period for the kneading is 15 seconds or longer, and the rotating speed of the stirring rotor of the internal mixer is 35 rpm or more while in step (III), the period for the kneading is 40 seconds or longer, and the rotating speed of the stirring rotor of the internal mixer is from 15 to 25 rpm. This manner makes it possible to prevent the carbon black in the rubber composition from being again aggregated and simultaneously keep a period for the reaction between the dihydrazide compound and the carbon black sufficiently long. For this reason, the carbon black is further improved in dispersibility in the rubber composition so that an improvement can be made, particularly, in the workability of the rubber composition and the low thermogenic performance of the vulcanized rubber.

The invention also relates to a rubber composition obtained by the above-mentioned producing method, and further to a pneumatic tire obtained by using the rubber composition. A vulcanized rubber obtained by using, as a raw material, this rubber composition has a low thermogenic performance; thus, a pneumatic tire having a tread made of this vulcanized rubber is improved very much in fuel-efficient performance.

DETAILED DESCRIPTION OF THE PREFERRED EMBODIMENTS

In a method according to the present invention for producing a rubber composition, an internal mixer is used to mix a diene rubber, a carbon black and a dihydrazide compound with each other.

In the rubber composition producing method according to the invention, an internal mixer is used. This internal mixer may be, for example, a gear-engaging type Banbury mixer, a tangential line type Banbury mixer, or a kneader. In particular, a gear-engaging type Banbury mixer is preferred.

Examples of the diene rubber include natural rubber (NR), polyisoprene rubber (IR), polystyrene butadiene rubber (SBR), polybutadiene rubber (BR), chloroprene rubber (CR), and nitrile rubber (NR). As the need arises, the following is preferably usable: such a rubber in which one or more terminals are modified (such as terminal-modified BR or terminal-modified SBR), or a rubber in which modification is attained to give a desired property to a rubber (such as modified NR). The species of the polybutadiene rubber (BR) may be a species synthesized, using a cobalt (Co), neodymium (Nd), nickel (Ni), titanium (Ti) or lithium (Li) catalyst; a species synthesized, using a polymerization catalyst composition containing a metallocene complex described in WO 2007-129670; or a polybutadiene rubber species containing syndiotactic crystal.

When the low thermogenic performance of a vulcanized rubber to be obtained is considered, the species of the polystyrene butadiene rubber is in particular preferably a species in which the styrene content by percentage is from 10 to 40% by mass, the vinyl bond content by percentage in its butadiene moieties is from 10 to 70% by mass, and the content by percentage of its cis isomers is 10% or more by mass. The species is in particular preferably a species in which the styrene content by percentage is from 15 to 25% by mass, the vinyl bond content by percentage in its butadiene moieties is from 10 to 60% by mass, and the content by percentage of its cis isomers is 20% or more by mass. When the vulcanized rubber is used for a tread rubber region of a pneumatic tire, it is more preferred to use a polystyrene butadiene rubber species of a non-oil-added type than of an oil-added type.

In the invention, the diene rubber is preferably natural rubber (NR). When the total amount of the diene rubber is regarded as 100 parts by mass, the amount of the natural rubber contained therein is preferably 50 parts or more by mass, more preferably 75% or more by mass, in particular preferably about 100 parts or more by mass.

The dihydrazide compound is a compound having, in the molecule thereof, two hydrazide groups ($-CONHNH_2$). Examples thereof include dihydrazide isophthalate, dihydrazide terephthalate, dihydrazide azelate, dihydrazide adipate, dihydrazide succinate, dihydrazide dieicosanoate, and 7,11-octadecadiene-1,18-dicarbohydrazide. Of these compounds, dihydrazide isophthalate and dihydrazide adipate are preferred, and dihydrazide isophthalate is more preferred in the invention.

In the rubber composition producing method according to the invention, the dihydrazide compound is blended in an amount preferably from 0.1 to 5.0 parts by mass, preferably from 0.3 to 3.0 parts by mass for 100 parts by mass of the diene rubber.

The carbon black may be any carbon black species usable in ordinary rubber industries, such as SAF, ISAF, HAF, FEF or GPF, or may be any electroconductive carbon black species such as acetylene black or Ketjenblack.

In the rubber composition producing method according to the invention, the carbon black is blended in an amount preferably from 20 to 80 parts by mass, more preferably from 30 to 60 parts by mass for 100 parts by mass of the diene rubber.

In the invention, an inorganic filler such as silica may be used together with the carbon black. When the inorganic filler is used together, the content of the carbon black and the inorganic filler is preferably from 35 to 80 parts by mass for 100 parts by mass of the diene rubber.

The rubber composition producing method according to the invention initially has step (I) of kneading the diene rubber and the carbon black to be mixed with each other, and then discharging the resultant mixture containing the diene rubber and the carbon black from the internal mixer. In the case of using, as the internal mixer, a gear-engaging type Banbury mixer, it is preferred to set the period for the kneading in step (I) into the range of 100 to 600 seconds, set the rotating speed of its stirring rotor into that of 30 to 60 rpm, and set the kneading temperature to 170° C. or lower.

The rubber composition producing method according to the invention next has step (II) of kneading the mixture, which contains the diene rubber and the carbon black, again in the internal mixer to prevent the carbon black in the mixture from aggregating again. In the case of having been using, as the internal mixer, the gear-engaging type Banbury mixer, it is preferred to set the period for the kneading in step (II) to 15 seconds or longer, and set the rotating speed of the stirring rotor to 35 rpm or more. The upper limit of the kneading period and that of the rotating speed of the stirring rotor are each not particularly limited, and are preferably 180 seconds and 100 rpm, respectively, from the viewpoint of the productivity of the rubber composition, and the preventing of rubber scorch. The kneading temperature is set preferably to 120° C. or lower.

The rubber composition producing method according to the invention further has step (III) of charging, after step (II), the dihydrazide compound into the internal mixer, and kneading the mixture, which contains the diene rubber and the carbon black, and the dihydrazide compound to be mixed with each other. In the case of having been using, as the internal mixer, the gear-engaging type Banbury mixer, it is preferred to set the period for the kneading in step (III) to 40 seconds or longer, and set the rotating speed of the stirring rotor into the range of 15 to 25 rpm. The upper limit of the kneading period is not particularly limited, and is preferably 500 seconds from the viewpoint of the productivity of the rubber composition, and the preventing of rubber scorch. The kneading temperature is set preferably to 120° C. or lower.

In the invention, it is allowable to perform step (III) while a PID control is made. Specifically, in the case of having been using, as the internal mixer, an internal mixer having a kneading chamber equipped with a pair of stirring rotors, it is allowable to adjust the rotating speed of a motor for the rotors on the basis of control signals, and control, in a control unit therefor, the rotating speed of the motor on the basis of data on the inside temperature of the kneading chamber that are sent from the temperature sensor concerned. It is sufficient for the control that the motor can be freely varied in rotating speed through the control unit. The motor is, for example, an inverter motor.

More specifically, about the rotating speed of the motor, in a PID calculating section located inside the control unit, a PID control is made on the basis of making proportional (P), integral (I) and differential (D) operations, using a deviation between the actual inside temperature Tp of the kneading chamber, which is detected with the temperature sensor, and a target temperature Ts. In other words, the PID calculating section determines the rotating speed of the motor on the basis of the total value of respective control values obtained by a proportion (P) operation for calculating the control quantity in proportion to the difference (deviation "e") between the actual inside temperature Tp of the kneading chamber, which is detected with the temperature sensor, and the target temperature Ts, an integral (I) operation for calculating the control quantity in accordance with the integral value obtained by integrating the deviation "e" along the time axis direction, and a differential (D) operation for calculating the control quantity in accordance with the gradient of a change in the deviation "e", that is, the differential value.

In the rubber composition producing method according to the present invention, preferably, blending agents different from any vulcanization-related blending agent are blended and dispersed into the existing system in step (I). Examples of the different blending agents include carbon black, silica, a silane coupling agent, an anti-aging agent, zinc oxide, a softening agent such as stearic acid, wax or oil, a processing aid, an organic acid metal salt, a methylene acceptor, and a methylene donor.

Examples of the organic acid metal salt include cobalt naphthenate, cobalt stearate, cobalt borate, cobalt oleate, cobalt maleate, and cobalt borate trineodecanoate.

The methylene acceptor may be a phenolic compound, or a phenolic resin, in which a phenolic compound is condensed with formaldehyde. Examples of the phenolic compound include phenol and resorcin; respective alkyl derivatives thereof; and respective alkyl derivatives of other phenolic compounds. Examples of the alkyl derivatives include methyl derivatives of cresol or xylenol; and respective long-chain alkyl derivatives of phenolic compounds, such as nonylphenol and octylphenol. The phenolic compound may be a phenolic compound having, as its substituent, an acyl group such as an acetyl group.

Examples of the phenolic resin, in which a phenolic compound is condensed with formaldehyde, include resorcin-formaldehyde resin, phenolic resin (phenol-formaldehyder-esin), cresolresin(cresol-formaldehyde resin), and formaldehyde resins each made from plural phenolic compounds. These are each used in the form of an uncured resin having fluidity or thermal fluidity.

Of these methylene receptors, resorcin or a resorcin derivative is preferred from the viewpoint of the compatibility thereof with the rubber component or other components, the density of a resin obtained after the curing thereof, and the reliability. Particularly preferred is resorcin or resorcin-alkylphenol-formalin resin.

The methylene donor may be hexamethylenetetramine or a melamine resin. Examples of the melamine resin include methylolmelamine, a partially etherized product of methylolmelamine, and condensates each made from melamine, formaldehyde, and methanol. Of these methylene donors, particularly preferred is hexamethoxymethylmelamine.

Another rubber may be added into the rubber composition. As this rubber also, a diene rubber usable for the production of a rubber master batch may be used.

The anti-aging agent may be any anti-aging agent usable ordinarily for rubbers. Examples thereof include aromatic amine type, amine-ketone type, monophenolic type, bisphenolic type, polyphenolic type, dithiocarbamic acid salt type, and thiourea type anti-aging agents. These may be used alone or in the form of an appropriate mixture. The content of the anti-aging agent (s) is preferably from 0.1 to 10 parts by mass, more preferably from 0.5 to 5 parts by mass for 100 parts by mass of the rubber component(s).

In the rubber composition producing method according to the present invention, preferably, one or more vulcanization-related blending agents are blended and dispersed into the existing system in step (III). According to the invention, in step (I), the diene rubber and the carbon black are kneaded to be mixed with each other, and then the mixture, which contains the diene rubber and the carbon black, is discharged from the internal mixer; thus, the mixture is cooled. This makes it possible to lower the initial temperature of the rubber composition in step (III) to prevent the rubber composition from being scorched. Examples of the vulcanization-related blending agent(s) include vulcanizers such as sulfur and organic peroxides, vulcanization promoters, vulcanization promoting aids, and vulcanization retarders.

It is sufficient for the sulfur vulcanizers that their sulfur species is a sulfur species for ordinary rubbers. Examples thereof include powdery sulfur, precipitated sulfur, insoluble sulfur, and highly dispersed sulfur. Considering physical properties, the endurance and others of the rubber component(s) after being vulcanized, the blend amount of used one(s) of the sulfur vulcanizers is preferably from 0.5 to 8 parts by mass for 100 parts by mass of the rubber component (s) in terms of the amount of sulfur.

The vulcanization promoters may each be a vulcanization promoter usable usually for rubber vulcanization, and examples thereof include sulfeneamide type, thiuram type, thiazole type, thiourea type, guanidine type, and dithiocarbamic acid salt type vulcanization promoters. These may be used alone or in the form of an appropriate mixture. The blend amount of the vulcanization promoter(s) is preferably from 0.5 to 3 parts by mass for 100 parts by mass of the rubber component(s).

EXAMPLES

Hereinafter, a description will be made about examples demonstrating the subject matter and the advantageous effects of the present invention, and others. About items for evaluating a rubber composition of each of the examples and the others, the following was evaluated on the basis of evaluating-methods described below: a rubber sample obtained by heating the rubber composition at 150° C. for 30 minutes to be vulcanized.

(1) Tan δ (Low Thermogenic Performance)

A viscoelastic spectrometer manufactured by a company, UBM, is used to measure the tan δ of the sample at an initial strain of 15%, a dynamic strain of ±2.5%, a frequency of 10 Hz and a temperature of 60° C. The low thermogenic performance thereof is evaluated on the basis of the tan δ value. The evaluation is made by regarding the value of Comparative Example 1 as 100, and obtaining an index of the sample to be evaluated, which is relative to the value of Comparative Example 1. As the resultant numerical value is smaller, the sample is better in low thermogenic performance.

(2) Workability

According to JIS K6300, the ML (1+4) of the sample is measured at a measuring temperature of 100° C. under conditions that the pre-heating period is 1 minute and the rotor operating period is 4 minutes. The evaluation is made by regarding the value of Comparative Example 1 as 100, and obtaining an index of the sample to be evaluated. As the resultant numerical value is smaller, the sample is better in workability.

Rubber Composition Preparation:

One or more rubber components and blending agents for each of Examples 1 to 8 and Comparative Examples 1 to 8 were mixed with each other in accordance with a blend formulation shown in Tables 1 and 2. An ordinary Banbury mixer was used to knead the resultant mixture to prepare a rubber composition. Details of each of the rubber component (s) and the blending agents shown in Tables 1 and 2 are described below (in these tables, the blend amount of each of the blending agents is shown as the number of parts by mass thereof for 100 parts by mass of the rubber component(s) in each of the examples). In the tables, each of the columns "Mixing conditions" represents the rotating speed (unit: rpm) of stirring rotors of the used internal mixer, and the kneading period (unit: s (seconds)). In each of Comparative Examples 1, 2, 4, 5, 6, and 8, the stirring was continuously performed without changing the rotating speed. Thus, the described kneading period represents the total period of steps (II) and (III).

a) Rubber components:
   Natural rubber (NR): product, "RSS #3", and
   Polybutadiene rubber (BR): product, "BR150B", each manufactured by Ube Industries, Ltd.
b) Carbon black (ISAF): product, "SEAST 6", manufactured by Tokai Carbon Co., Ltd.
c) Oil: product, "JOMO PROCESS P200", manufactured by Japan Energy Corp.
d) Silica: product, "NIPSIL AQ", manufactured by Tosoh Silica Corp.
e) Silane coupling agent: product, "Si69", manufactured by a company, Evonik Degussa
f) Zinc oxide: product, "AENKA No. 1", manufactured by Mitsui Mining and Smelting Co., Ltd.
g) Stearic acid: product, "BEADS STEARIC ACID", manufactured by NOF Corp.
h) Anti-aging agent: product, "ANTIGEN 6C", manufactured by Sumitomo Chemical Co., Ltd.
i) Wax: product, "OZOACE 0355", manufactured by Nippon Seiro Co., Ltd.
j) Vulcanization promoter: product, "SANCELLER CM-G", manufactured by Sanshin Chemical Industry Co., Ltd.
k) Sulfur: powdery sulfur, manufactured by Tsurumi Chemical Industry Co., Ltd.
l) Dihydrazide compound: dihydrazide isophthalate (IDH), available from Tokyo Chemical Industry Co., Ltd.

TABLE 1

|  |  | Example 1 | Example 2 | Example 3 | Example 4 | Comparative Example 1 | Comparative Example 2 | Comparative Example 3 | Comparative Example 4 |
|---|---|---|---|---|---|---|---|---|---|
| Step (I) | Natural rubber | 100 | 100 | 100 | 100 | 100 | 100 | 100 | 100 |
|  | Carbon black | 45 | 45 | 45 | 45 | 45 | 45 | 45 | 45 |
|  | Oil | 3 | 3 | 3 | 3 | 3 | 3 | 3 | 3 |
|  | Anti-aging agent | 2 | 2 | 2 | 2 | 2 | 2 | 2 | 2 |
|  | Zinc oxide | 3 | 3 | 3 | 3 | 3 | 3 | 3 | 3 |
|  | Stearic acid | 2 | 2 | 2 | 2 | 2 | 2 | 2 | 2 |
|  | Dihydrazide isophthalate | — | — | — | — | — | — | 0.5 | 0.5 |
|  | Mixing conditions | 50 rpm/ 30 s | 50 rpm/ 30 s | 50 rpm/ 30 s | 50 rpm/ 30 s | 50 rpm/ 30 s | 50 rpm/ 30 s | 50 rpm/ 30 s | 50 rpm/ 30 s |
| Step (II) | Mixing conditions | 40 rpm/ 15 s | 40 rpm/ 20 s | 40 rpm/ 15 s | 40 rpm/ 15 s | *1 | *2 | 40 rpm/ 15 s | *1 |
| Step (III) | Vulcanization promoter | 1.5 | 1.5 | 1.5 | 1.5 | 1.5 | 1.5 | 1.5 | 1.5 |
|  | Sulfur | 1.5 | 1.5 | 1.5 | 1.5 | 1.5 | 1.5 | 1.5 | 1.5 |
|  | Dihydrazide isophthalate | 0.5 | 0.5 | 0.5 | 0.5 | 0.5 | 0.5 | — | — |
|  | Mixing conditions | 20 rpm/ 45 s | 20 rpm/ 45 s | 20 rpm/ 60 s | *3 | *1 | *2 | 20 rpm/ 45 s | *1 |

TABLE 1-continued

|  | Example 1 | Example 2 | Example 3 | Example 4 | Comparative Example 1 | Comparative Example 2 | Comparative Example 3 | Comparative Example 4 |
|---|---|---|---|---|---|---|---|---|
| Rubber composition physical properties |  |  |  |  |  |  |  |  |
| Viscosity index | 102 | 102 | 103 | 98 | 100 | 102 | 151 | 148 |
| Workability evaluation | ○ | ○ | ○ | ○ | ○ | ○ | x | x |
| Vulcanized rubber physical property |  |  |  |  |  |  |  |  |
| Low thermogenic performance index | 88 | 88 | 87 | 86 | 100 | 101 | 91 | 97 |

*1: Steps (I) and (II) were continuously performed; the total period was 60 sec, and the rotating speed was 40 rpm.
*2: Steps (I) and (II) were continuously performed; the total period was 60 sec, and the rotating speed was 20 rpm.
*3: PID control was made. Kneading was performed for 45 sec at a control temperature of 110° C. In the PID control, the rotating speed of the stirring rotors was from 17 to 23 rpm.

TABLE 2

|  |  | Example 5 | Example 6 | Example 7 | Example 8 | Comparative Example 5 | Comparative Example 6 | Comparative Example 7 | Comparative Example 8 |
|---|---|---|---|---|---|---|---|---|---|
| Step (I) | Natural rubber | 70 | 70 | 70 | 70 | 70 | 70 | 70 | 70 |
|  | Polybutadiene rubber | 30 | 30 | 30 | 30 | 30 | 30 | 30 | 30 |
|  | Carbon black | 38 | 38 | 38 | 38 | 38 | 38 | 38 | 38 |
|  | Silica | 7 | 7 | 7 | 7 | 7 | 7 | 7 | 7 |
|  | Silane coupling agent | 0.8 | 0.8 | 0.8 | 0.8 | 0.8 | 0.8 | 0.8 | 0.8 |
|  | Oil | 3 | 3 | 3 | 3 | 3 | 3 | 3 | 3 |
|  | Anti-aging agent | 2 | 2 | 2 | 2 | 2 | 2 | 2 | 2 |
|  | Zinc oxide | 3 | 3 | 3 | 3 | 3 | 3 | 3 | 3 |
|  | Stearic acid | 2 | 2 | 2 | 2 | 2 | 2 | 2 | 2 |
|  | Dihydrazide isophthalate | — | — | — | — | — | — | 0.5 | 0.5 |
|  | Mixing conditions | 50 rpm/ 30 s | 50 rpm/ 30 s | 50 rpm/ 30 s | 50 rpm/ 30 s | 50 rpm/ 30 s | 50 rpm/ 30 s | 50 rpm/ 30 s | 50 rpm/ 30 s |
| Step (II) | Mixing conditions | 40 rpm/ 15 s | 40 rpm/ 20 s | 40 rpm/ 15 s | 40 rpm/ 15 s | *1 | *2 | 40 rpm/ 15 s | *1 |
| Step (III) | Vulcanization promoter | 1.5 | 1.5 | 1.5 | 1.5 | 1.5 | 1.5 | 1.5 | 1.5 |
|  | Sulfur | 1.5 | 1.5 | 1.5 | 1.5 | 1.5 | 1.5 | 1.5 | 1.5 |
|  | Dihydrazide isophthalate | 0.5 | 0.5 | 0.5 | 0.5 | 0.5 | 0.5 | — | — |
|  | Mixing conditions | 20 rpm/ 45 s | 20 rpm/ 45 s | 20 rpm/ 60 s | *3 | *1 | *2 | 20 rpm/ 45 s | *1 |
| Rubber composition physical properties |  |  |  |  |  |  |  |  |  |
| Viscosity index |  | 100 | 99 | 101 | 97 | 100 | 103 | 155 | 151 |
| Workability evaluation |  | ○ | ○ | ○ | ○ | ○ | ○ | x | x |
| Vulcanized rubber physical property |  |  |  |  |  |  |  |  |  |
| Low thermogenic performance index |  | 92 | 92 | 91 | 89 | 100 | 99 | 93 | 99 |

*1: Steps (I) and (II) were continuously performed; the total period was 60 sec, and the rotating speed was 40 rpm.
*2: Steps (I) and (II) were continuously performed; the total period was 60 sec, and the rotating speed was 20 rpm.
*3: PID control was made. Kneading was performed for 45 sec at a control temperature of 110° C. In the PID control, the rotating speed of the stirring rotors was from 17 to 23 rpm.

From the results in Tables 1 and 2, it is understood that vulcanized rubbers of the rubber compositions obtained in Examples 1 to 8, respectively, were excellent in low thermogenic performance, and further the rubber compositions were excellent in workability.

However, in Comparative Examples 1 and 5, the rotating speed of the stirring rotors was too high in step (III). Thus, reaction between the dihydrazide compound and the carbon black advanced rapidly so that locational unevenness was caused in the reaction. Thus, the dispersibility of the carbon black was insufficient. Consequently, the vulcanized rubbers of these examples were poorer in low thermogenic performance than those of Examples. In Comparative Examples 2 and 6, the rotating speed of the stirring rotors was too low in step (II). Thus, in their rubber composition, re-aggregates of the carbon black were insufficiently crushed. After all, locational unevenness was caused in the reaction, so that the dispersibility of the carbon black was insufficient. Consequently, the vulcanized rubbers of these examples were poorer in low thermogenic performance than those of Examples. Furthermore, in Comparative Examples 3, 4, and 7 and 8, at the same time when the diene rubber and the carbon black were kneaded, the dihydrazide compound was charged and blended thereinto, so that their rubber composition was remarkably deteriorated in workability and further their vulcanized rubber was also deteriorated in low thermogenic performance.

What is claimed is:
1. A method for producing a rubber composition, using an internal mixer having a stirring rotor to mix a diene rubber, a carbon black and a dihydrazide compound with each other,
   comprising step (I) of kneading the diene rubber and the carbon black to be mixed with each other, and then discharging the resultant mixture containing the diene rubber and the carbon black from the internal mixer,
   step (II) of kneading the mixture again in the internal mixer to crush a re-aggregate of the carbon black in the mixture, and step (III) of charging, after step (II), the dihydrazide compound into the internal mixer, and kneading the mixture and the dihydrazide compound to be mixed with each other, wherein in step (II), the period for the kneading is 15 seconds or longer, and the rotating speed of the stirring rotor of the internal mixer is 35 rpm or more, and in step (III), the period for the kneading is 40 seconds or longer, and the rotating speed of the stirring rotor of the internal mixer is from 15 to 25 rpm.

2. A rubber composition obtained by the producing method recited in claim 1.

3. A pneumatic tire obtained by using the rubber composition recited in claim 2.

* * * * *